United States Patent
Obendiek

(10) Patent No.: US 6,672,646 B2
(45) Date of Patent: Jan. 6, 2004

(54) FASTENING DEVICE FOR A CONVERTIBLE TOP

(75) Inventor: Klaus Obendiek, Passau (DE)

(73) Assignee: Edscha Cabrio-Dachsysteme GmbH, Hengersberg (DE)

(*) Notice: Subject to any disclaimer, the term of this patent is extended or adjusted under 35 U.S.C. 154(b) by 0 days.

(21) Appl. No.: 10/350,678

(22) Filed: Jan. 24, 2003

(65) Prior Publication Data

US 2003/0141741 A1 Jul. 31, 2003

(30) Foreign Application Priority Data

Jan. 25, 2002 (DE) .......................... 102 02 780

(51) Int. Cl.[7] .................................................. B06J 7/00
(52) U.S. Cl. .................. 296/121; 296/107.08; 292/110; 292/113
(58) Field of Search ............................ 296/121, 107.08; 292/110, 113

(56) References Cited

U.S. PATENT DOCUMENTS

| | | | | |
|---|---|---|---|---|
| 3,266,838 A | * | 8/1966 | Heincelman | 296/121 |
| 3,353,864 A | * | 11/1967 | Antaya et al. | 296/121 |
| 4,817,999 A | * | 4/1989 | Drew | 296/121 |
| 4,830,425 A | * | 5/1989 | Muscat | 296/121 |
| 4,830,426 A | * | 5/1989 | Schlachter et al. | 296/121 |
| 5,004,291 A | * | 4/1991 | Bauer et al. | 296/121 |
| 5,058,939 A | * | 10/1991 | Miilu | 292/110 |
| 5,085,483 A | * | 2/1992 | Alexander | 296/121 |
| 5,154,479 A | * | 10/1992 | Sautter, Jr. | 296/121 |
| 5,284,378 A | * | 2/1994 | Sautter, Jr. | 296/121 |
| 5,328,229 A | * | 7/1994 | Brandt et al. | 296/121 |
| 5,839,778 A | * | 11/1998 | Schaible et al. | 296/121 |
| 5,944,375 A | * | 8/1999 | Schenk et al. | 296/121 |
| 6,033,008 A | * | 3/2000 | Mattila | 296/121 |
| 6,042,174 A | * | 3/2000 | Durrani | 296/121 |
| 6,155,614 A | * | 12/2000 | Lange | 292/113 |
| 6,213,534 B1 | * | 4/2001 | Mac Farland | 296/121 |
| 6,290,281 B1 | * | 9/2001 | Durrani et al. | 296/121 |
| 6,419,297 B2 | * | 7/2002 | Haberl et al. | 296/121 |
| 6,595,574 B2 | * | 7/2003 | Shaw et al. | 296/121 |
| 2002/0185887 A1 | * | 12/2002 | Hasselgruber et al. | 296/121 |
| 2003/0057728 A1 | * | 3/2003 | Sims | 296/107.08 |

FOREIGN PATENT DOCUMENTS

| | | | |
|---|---|---|---|
| DE | 3006151 | | 9/1980 |
| DE | 4111646 | | 10/1992 |
| DE | 19964066 | | 7/2001 |
| DE | 100 29 471 | * | 1/2002 |
| DE | 100 29 478 | * | 1/2002 |
| DE | 10030760 | | 1/2002 |
| EP | 0850793 | | 7/1998 |

* cited by examiner

*Primary Examiner*—Kiran Patel
(74) *Attorney, Agent, or Firm*—Davidson, Davidson & Kappel, LLC

(57) ABSTRACT

A fastening device for a convertible top includes a front bow, a front window frame, a bracket disposed on one of the front bow and the front window frame, a first catch element assigned to the other of the front bow and the front window frame, and at least one second catch element. The first catch element is secured so as to be pivotable about a first axis, and is connectable to the bracket. The at least one second catch element is connectable to the bracket and pivotable about a second axis spaced apart from the first axis.

16 Claims, 4 Drawing Sheets

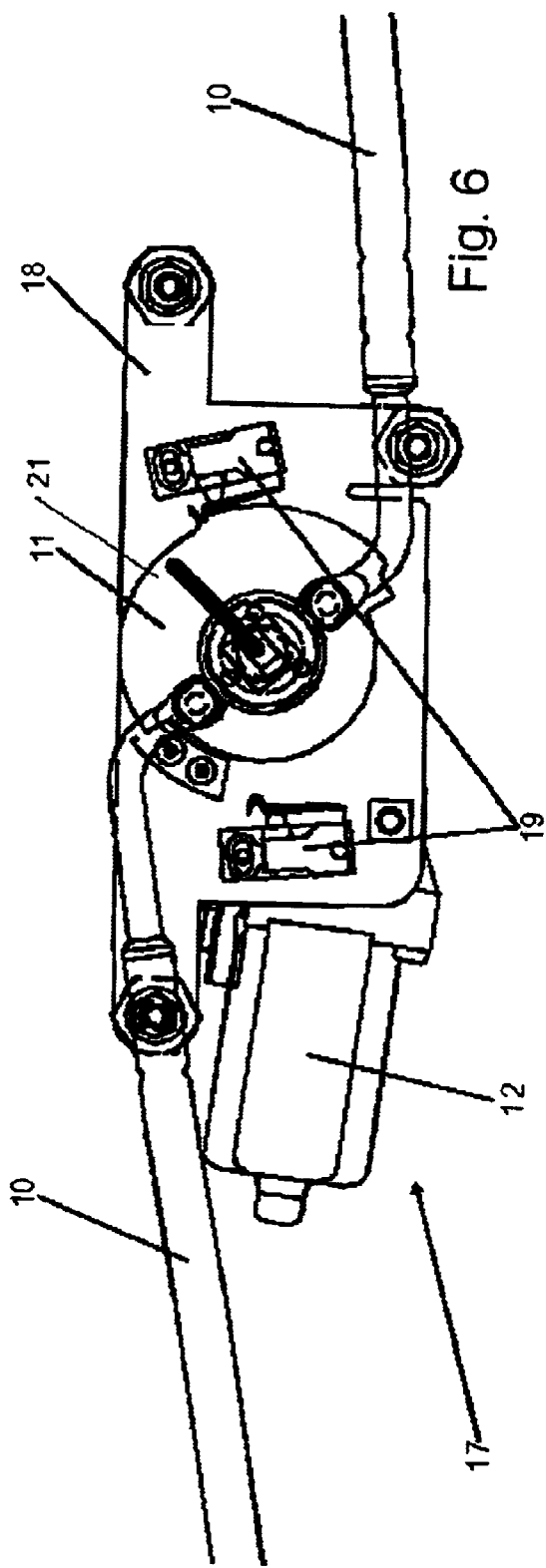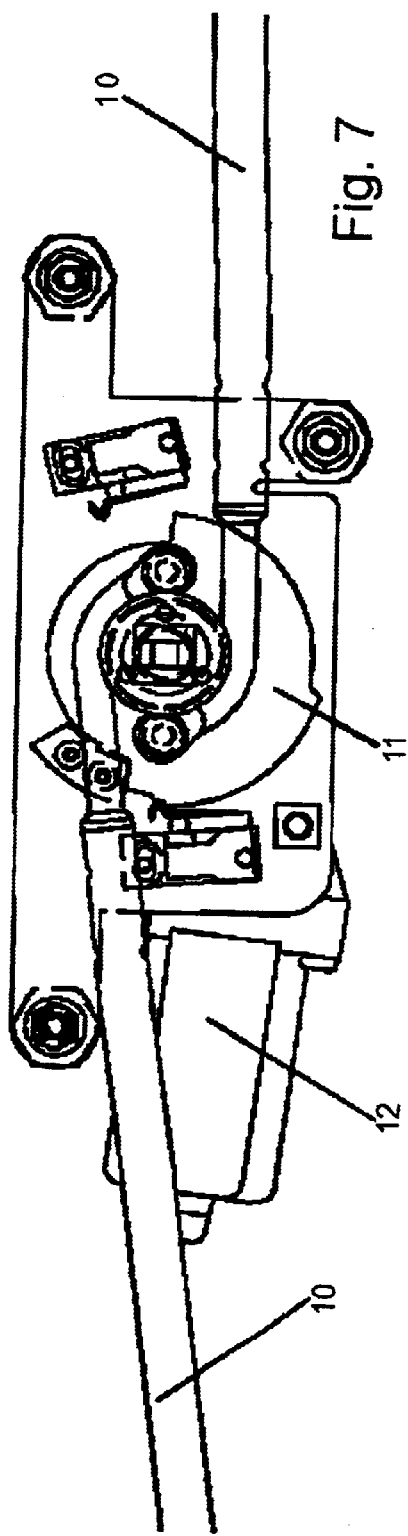

FASTENING DEVICE FOR A CONVERTIBLE TOP

CROSS-REFERENCE TO RELATED APPLICATIONS

Priority is claimed to German Patent Application No. DE 102 02 780.3-21, filed Jan. 25, 2002, which is incorporated by reference herein.

BACKGROUND INFORMATION

The present invention relates generally to a fastening device and specifically to a fastening device for a convertible top.

A fastening for a convertible top is used for securing convertible tops on front window frames. In particular, in the case of the opening and closing movements of the convertible top being automated, the convertible-top fastener on the front side has to meet specific requirements. For example, it is desirable for the fastener, on the one hand, to ensure that fastener brackets are reliably caught during the closing movement and, on the other hand, to ensure, during the opening operation of the convertible top, that the front bow is reliably pushed away from the front window frame and the head region of the passenger in the first step of the convertible-top opening movement.

European Patent Document EP 0 850 793 A1 describes a fastening device for a convertible top in the case of which pull and push rods can be moved by means of an actuating lever, and laterally arranged hook elements can be pivoted, by means of the pull and push rods, about a pivot axis which is essentially parallel to the longitudinal axis of the vehicle. A disadvantage here is that, in their closed position, the hook elements can be secured merely via the actuating element being fixed, but are not actually located in an over-dead-center position. In addition, the shaping of the hook elements results in the occurrence, during a closing movement, of large, predominantly laterally acting frictional forces which lead, in principle, to an increased amount of force having to be exerted by the actuating lever.

German Patent Document DE 30 06 151 C2 describes a motor-vehicle lock in the case of which a first retaining lever and a second retaining lever are designed such that they can be pivoted in opposite directions, the two retaining levers, in a closed state, acting on the same bracket and retaining the latter in the fastened position. The retaining levers here are provided with partially circular recesses, which correspond with the bracket, the latter, in the closed state, only being partially enclosed overall by the recesses.

German Patent Document DE 100 30 760 A1 describes a fastening device for a vehicle roof in the case of which a first fastening hook can be brought into engagement with a first fastening bracket and a second fastening hook can be brought into engagement with a second fastening bracket, the first fastening bracket being spaced apart from the second fastening bracket, and it being possible for the fastening hooks to be pivoted in opposite directions to one another during a closing movement.

German Patent Document DE 41 11 646 describes a fastening device for a vehicle roof in the case of which, in the closed state, a first lever acts with retaining action on a fastening bracket and a second lever acts upon a latching step of the first lever.

German Patent Document DE 199 64 066 A1 describes a fastening device for a convertible vehicle in the case of which a pivotable fastening catch comprises a curved recess which is open on one side and into which a fastening bracket engages in the closed state of the fastening device.

SUMMARY OF THE INVENTION

It is an object of the present invention to provide, for a convertible top, a fastening device, which allows an advantageous closing movement of the convertible top.

The present invention provides a fastening device for a convertible top that includes: a front bow; a front window frame; a bracket, which is arranged on one of the group of the front bow and the front window frame; a first catch element, which is assigned to the respectively other component of the group of the front bow and the front window frame, said first catch element being secured in a movable manner and being connectable to said bracket, it being possible for the first catch element to be pivoted about a first axis; and at least one second catch element, which can be connected to said bracket; wherein the second catch element can be pivoted about a second axis, said second axis being spaced apart from said first axis.

In this case, a second catch element, which acts on the same bracket as the first catch element respectively, ensures a closing movement, which is particularly advantageous with respect to lateral frictional forces.

It is advantageous here for the catch elements to have essentially slot-like recesses, the bracket engaging in the slot-like recess in a closed state of the fastening device. This makes it possible, at the same time, for the front bow to be drawn down during the closing movement and for the front bow to be pushed upwards during the opening movement, with the result that the catch elements are supported on the bracket in both cases.

It is particularly advantageous for the two catch elements to be pivotable in opposite directions to one another and to cover over one another in a scissors-like manner. This ensures in a simple manner that the pulling and pushing forces, which occur are directed essentially in the direction of the vertical axis of the vehicle.

In a preferred embodiment of a fastening device according to the invention, the two catch elements and a turnable cross lever, which is mounted so that it can be rotated about a third axis, are accommodated in a common housing, in each case one intermediate link providing a connection between the turnable cross lever and one of the catch elements. The two catch elements can thus advantageously be driven by means of a link rod, and it is easily possible for the fastening element to be secured by means of over-dead-center positions of the intermediate links in the closed position of the fastening device.

It is particularly preferable for the link rod to be articulated, at the other end, on a turning disk which can be driven in rotation by means of a handle or of an electric motor, and, in the open position of the fastening device, the link rod is secured on the turning disk in an over-dead-center position. This straightforwardly ensures that the fastening device is secured by an over-dead-center position of a movable element both in the closed position and in the open position.

It is particularly preferable, for particularly reliable securing of the front bow of a convertible top, for in each case one of the fastening devices according to the invention to be arranged on a side of the vehicle, in the lateral region of the front bow.

Further advantages and features of a fastening device according to the invention can be gathered from the exemplary embodiment described below and from the claims.

BRIEF DESCRIPTION OF THE DRAWINGS

A preferred exemplary embodiment of a fastening device according to the invention is described below and explained in more detail with reference to the attached drawings, in which:

FIG. 6 shows a plan view of an actuating device of the fastening device according to the invention from FIG. 1 in a closed position; and FIG. 7 shows the actuating device from FIG. 6 in an open position.

DETAILED DESCRIPTION OF A PREFERRED EMBODIMENT

Figure 1:
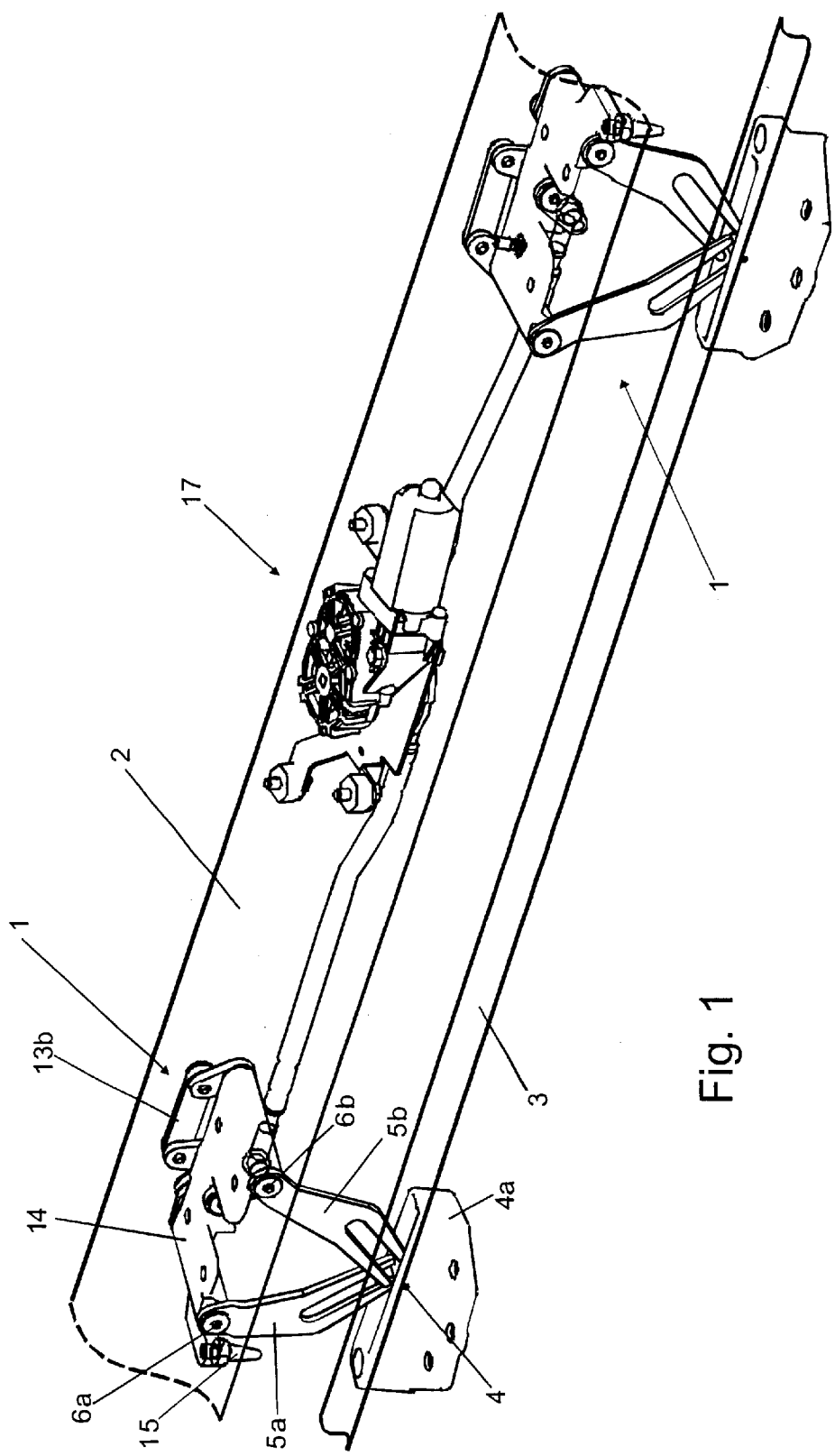
FIG. 1 shows a three-dimensional front view of a fastening device according to the invention.
Figure 2:
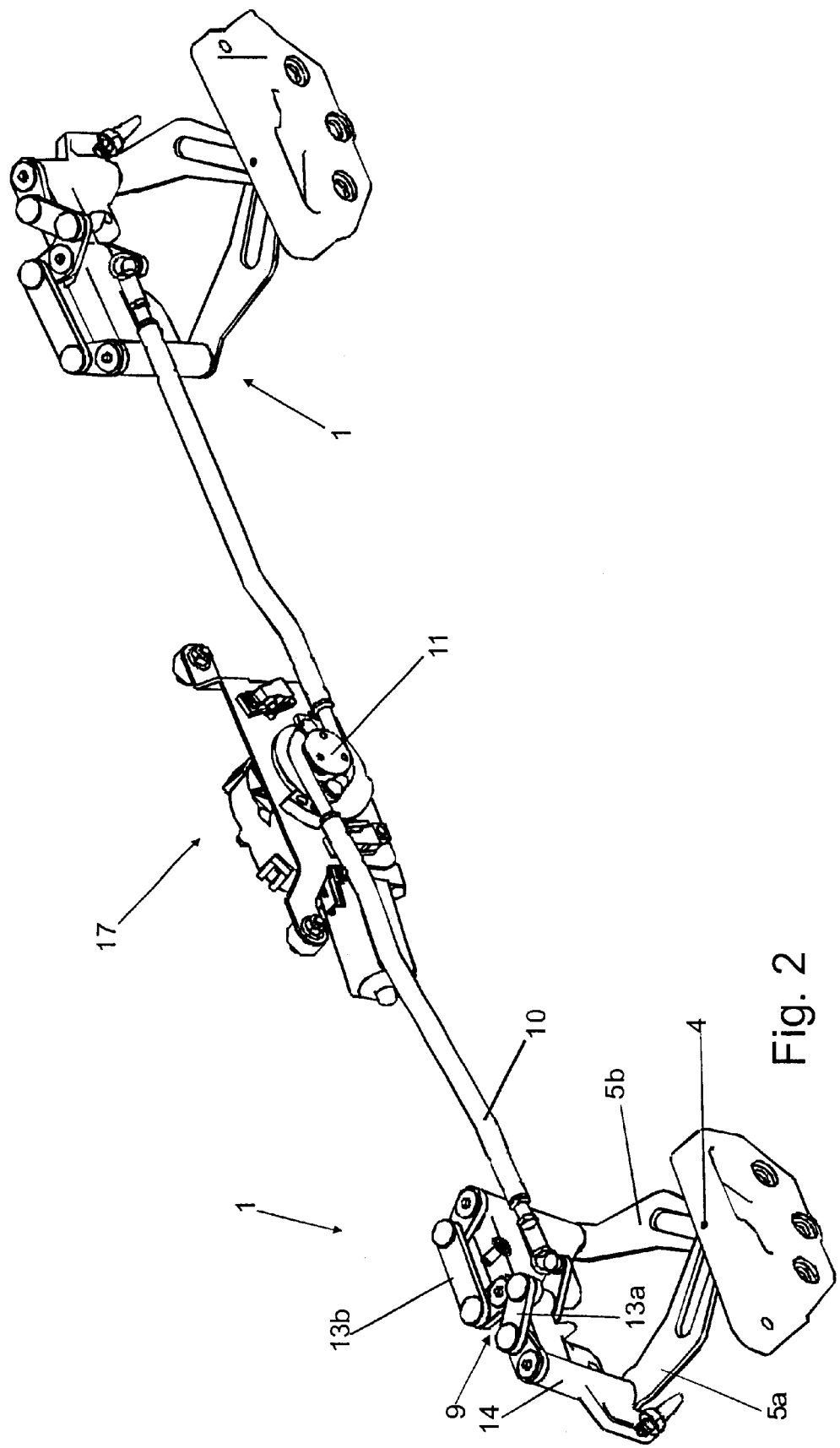
FIG. 2 shows a bottom view of the fastening device from FIG. 1.

FIG. 1 shows a schematically illustrated detail of a front window frame 3 and a front bow 2, which can be secured on said frame, of a convertible top. One fastening device 1 according to the invention is arranged in each case in the lateral region of the front window frame 3 and of the front bow 2. That part of the fastening device, which is arranged on the front window frame 3 comprises a bracket 4, which is formed in a housing-like bracket pocket 4a which can be mounted, as a module, on the front window frame 3.

Figure 3:
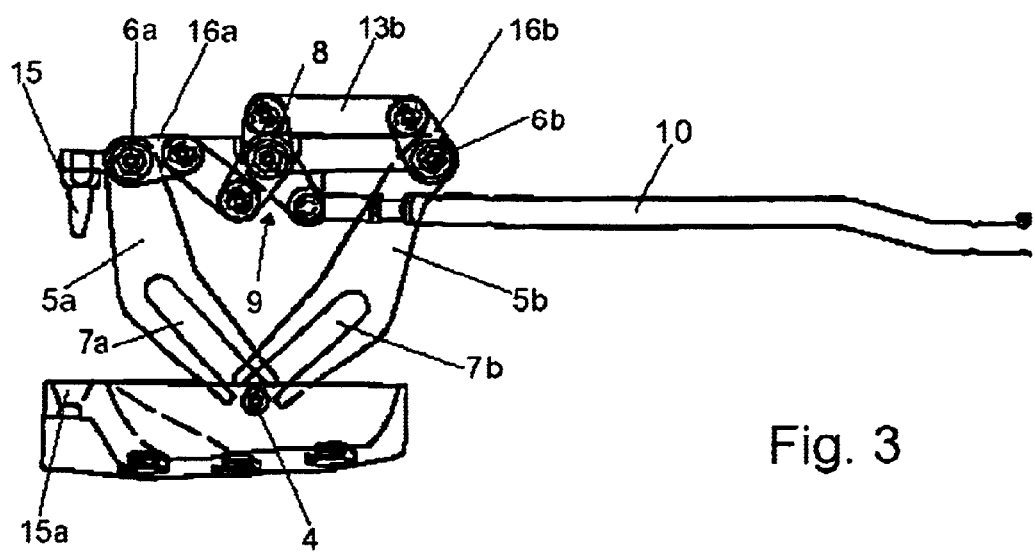
FIG. 3 shows a front view, in detail form, of the fastening device from FIG. 1 in an open position.
Figure 4:
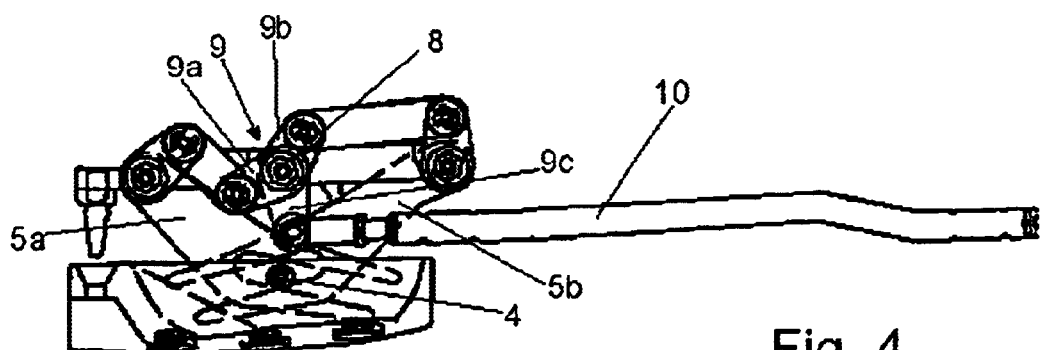
FIG. 4 shows the fastening device from FIG. 3 in a partially closed position.
Figure 5:
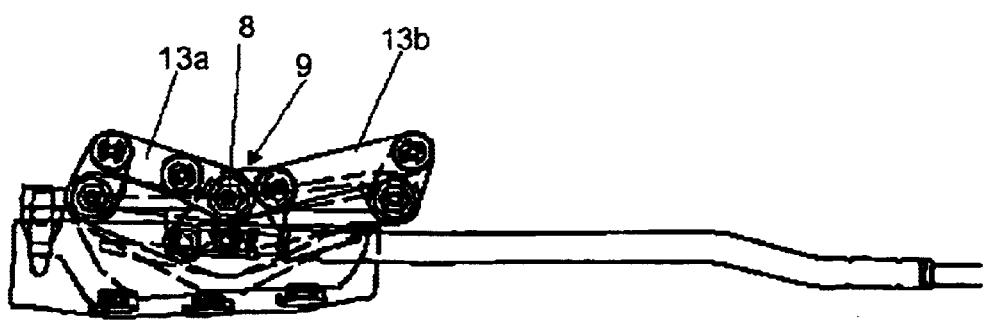
FIG. 5 shows the fastening device from FIG. 3 in a closed position.

That part of the fastening device 1 which is formed on the front bow 2 comprises, as shown in particular by FIGS. 3 to 5, a housing 14, which is secured on the front bow 2 and on which are formed a first catch element 5a, which can be pivoted about a first axis 6a, a second catch element 5b, which can be pivoted about a second axis 6b, a turnable cross lever 9, which can be pivoted about a third axis 8, and a first intermediate link 13a, which connects the cross lever 9 to the first catch element 5a, and a second intermediate link 13b, which connects the cross lever 9 to the second catch element 5b. The catch elements 5a, 5b are secured in a form-fitting and rotationally fixed manner in each case, by means of hexagonal elements, on axes 6a, 6b which engage through the housing 14, crank members 16a, 16b being secured in a rotationally fixed manner in each case at the other end of the axes 6a, 6b, with the result that in each case one of the catch elements 5a, 5b, one of the axes 6a, 6b and one of the crank members 16a, 16b together form a unit which is rigid but is mounted in a rotatable manner in the housing 14.

The cross lever 9 is constructed from the third axis 8, which engages through the housing 14 and is parallel to the first axis 6a and the second axis 6b, as well as three crank members 9a, 9b, 9c, which are secured in a form-fitting and rotationally-fixed manner on the third axis 8 by means of hexagonal elements. In each case one of the above mentioned crank members 9a, 9b is respectively connected in an articulated manner to the crank member 16a of the first catch element 5a by means of the first intermediate link 13a and to the crank member 16b of the second catch element 5b by means of the second intermediate link 13b. A link rod 10 is articulated via a ball-and-socket joint on the third crank member 9c of the cross lever 9, the other end of the link rod 10 being articulated on a turning disk 11 belonging to an actuating device 17 (see FIG. 6).

The actuating device 17 comprises a carrier plate 18, which is connected to the front bow 2, as well as the turning disk 11 and an electric motor 12 with reduction gear, said motor driving the turning disk. Alternatively, handle 21 may be used to drive the turning disk. Sensor switches 19 which can interrogate a position of the turning disk 11 electronically are likewise secured on the carrier plate 18.

The invention functions as follows:

The fastening device 1 is located first of all in an open position according to FIG. 3, the actuating device 17 being located in a position according to FIG. 7. In this position according to FIG. 7, the link rods 10 are located in an over-dead-center position in relation to the axis of rotation of the turning disk 11, with the result that tensile loading of the link rod 10 would not result in movement of the turning disk 11. The fastening device 1 is located in such a position that its two catch elements 5a, 5b only partially overlap, with the result that an opening for the introduction of the bracket 4 into the slot-like recesses 7a, 7b of the catch elements 5a, 5b remains in an end region of the catch elements 5a, 5b.

Once the front bow 2 has been positioned on the front window frame 3, within the context of a closing movement of the convertible top, the fastening device being located in an open position, the bracket 4 is located in the slot-like recesses 7a, 7b (see FIG. 3). Since the link rods 10 are first of all located in an over-dead-center position in relation to the turning disk 11 (see FIG. 7), rotation of the turning disk is ruled out by the front bow 2 striking against the front window frame 3. Actuation of the turning disk 11 by means of the electric motor 12 then results in an essentially horizontal displacement of the link rod 10 to the left (see FIG. 3). The cross lever 9 is thus rotated in the clockwise direction, with the result that the left-hand catch element 5a, due to the articulation by the intermediate link 13a, rotates in the counterclockwise direction about the first axis of rotation 6a. At the same time, the second catch element 5b, driven by the second intermediate link 13b, rotates analogously in the clockwise direction about the second axis of rotation 6b. The slot-like recesses 7a, 7b of the two catch elements 5a, 5b, said recesses overlapping in a scissors-like manner, thus guide the bracket 4a essentially vertically, the laterally directed forces compensating each other.

FIG. 4 shows an intermediate position of the fastening element 1 on its way from the open position according to FIG. 3 into the closed position according to FIG. 5. It can be seen from FIG. 4 that, in this intermediate position, the intermediate links 13a, 13b are each arranged more or less at right angles to the crank members, with the result that, in this position, the torques and/or forces introduced by the link rod 10 can be transmitted particularly effectively to the catch elements 5a, 5b. It should also be noted that the frictional forces which occur between the bracket 4 and catch elements 5a, 5b decrease as the angle between the slot-like recesses 7a, 7b flattens during the movement from the position according to FIG. 3 to the position according to FIG. 5. This means that it is also the case with respect to the scissors-like arrangement of the catch elements 5a, 5b that the transmission of a relatively large force is provided in a final section of the closing movement. This is advantageous, in particular, in the final section of the closing movement since increased resistance forces, for example from the contact pressure of seals, occurs here.

A conical centering axis 15 is formed on the housing 14, and is assigned a corresponding guide 15a in the bracket pocket 4a. In a final section of the closing movement of the convertible top, the front bow is positioned particularly precisely as a result of the interaction between the centering axis 15 and its guide 15a.

In the case of the fastening device 1 according to the invention being located in the closed position, which is shown in FIG. 5, each of the two intermediate links 13a, 13b is located in an over-dead-center position in relation to the third axis of rotation 8 of the cross lever 9. If external forces, for example induced by air stream or vibrations, which push the front bow 2 away from the front window frame 3 then occur, these forces would result in the first catch element 5a rotating in the clockwise direction and the second catch element 5b rotating in the counterclockwise direction. Such rotation of the catch elements, however, is blocked in each case by the two over-dead-center positions.

The opening movement of the fastening device 1 is introduced by the turning disk 11 being rotated in the clockwise direction from its closed position according to FIG. 6, as a result of which the link rod 10 is moved essentially horizontally to the right (see FIG. 5). The resulting rotation of the cross lever 9 in the counterclockwise direction (see FIG. 5) results first of all in the over-dead-center positions of the intermediate links 13a, 13b being eliminated and then in the fastening device 1 being opened, with the above described kinematics being reversed. In particular, the pivoting-open operation of the catch elements 5a, 5b results in the front bow 2 being pushed away from the front window frame 3, this leading to the occurrence of forces which are likewise only directed essentially parallel to the vertical axis of the vehicle.

What is claimed is:

1. A fastening device for a convertible top, comprising
   a front bow;
   a front window frame;
   a bracket disposed on one of the front bow and the front window frame;
   a first catch element assigned to the other of the front bow and the front window frame, said first catch element being secured so as to be pivotable about a first axis and connectable to said bracket; and
   at least one second catch element connectable to said bracket and pivotable about a second axis spaced apart from said first axis.

2. The fastening device as recited in claim 1, wherein at least one of the first and second catch elements has an slot-like recess, the bracket engaging in the slot-like recess in a closed state of the fastening device.

3. The fastening device as recited in claim 1, wherein the second catch element is pivotable in an opposite direction as the first catch element.

4. The fastening device as recited in claim 1, wherein the first and second catch elements each have a slot-like recess and overlap each other in a scissors-like manner.

5. The fastening device as recited in claim 1, further comprising a cross lever rotatable about a third axis and wherein the first catch element, the second catch element, and the cross lever, are accommodated in a housing.

6. The fastening device as recited in claim 5, further comprising a turning disk and a link rod articulated on a first end on the cross lever and on a second end on the turning disk, the link rod configured to rotate the cross lever about the third axis.

7. The fastening device as recited in claim 6, wherein, in an open position of the fastening device, the link rod is disposed in an over-dead-center position relative to the turning disk.

8. The fastening device as recited in claim 6, wherein the turning disk is drivable using a handle.

9. The fastening device as recited in claim 6, wherein the turning disk is drivable using an electric motor.

10. The fastening device as recited in claim 5, further comprising a first intermediate link connecting the first catch element to the cross lever in an articulated manner and a second intermediate link connecting the second catch element to the cross lever in an articulated manner.

11. The fastening device as recited in claim 10, wherein, in a closed position of the fastening device, at least one of the first and second intermediate links is located in an over-dead-center position.

12. The fastening device as recited in claim 11, wherein, in the closed position, the first and the second intermediate links are located in an over-dead-center position.

13. The fastening device as recited in claim 1, wherein the fastening device is disposed in a lateral region of the front bow and of the front window frame.

14. The fastening device as recited in claim 13, wherein the fastening device is provided on one side of the vehicle and further comprising a second fastening device disposed on another side of the vehicle.

15. The fastening device as recited in claim 1, wherein, the first and second catch elements are configured to push the front bow away from the front window frame during an opening movement.

16. The fastening device as recited in claim 1, wherein the first catch element and the second catch element act on a same bracket.

* * * * *